United States Patent
Jang et al.

(10) Patent No.: US 9,295,001 B2
(45) Date of Patent: Mar. 22, 2016

(54) SIGNAL AMPLIFICATION APPARATUS AND METHOD

(71) Applicant: Electronics and Telecommunications Research Institute, Daejeon (KR)

(72) Inventors: Seunghyun Jang, Daejeon (KR); Sung Jun Lee, Daejeon (KR); Young Kyun Cho, Daejeon (KR); Bong Hyuk Park, Daejeon (KR); Jae Ho Jung, Daejeon (KR); Kwangchun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 93 days.

(21) Appl. No.: 14/150,084

(22) Filed: Jan. 8, 2014

(65) Prior Publication Data
US 2015/0017932 A1     Jan. 15, 2015

(30) Foreign Application Priority Data
Jul. 10, 2013  (KR) .......................... 10-2013-0081098

(51) Int. Cl.
  *H04B 1/66*      (2006.01)
  *H01Q 11/12*    (2006.01)
  *H04B 1/04*      (2006.01)
  *H04W 52/04*   (2009.01)
  (Continued)

(52) U.S. Cl.
  CPC ............ *H04W 52/04* (2013.01); *H04W 52/241* (2013.01); *H04W 52/52* (2013.01)

(58) Field of Classification Search
  CPC ................ H04B 1/0483; H04B 2001/0416; H04B 2001/0491; H03C 5/00; H03G 3/3042
  USPC .................. 455/102, 108, 110, 127.1, 127.4; 375/298, 300
  See application file for complete search history.

(56) References Cited

U.S. PATENT DOCUMENTS 6,256,482 B1 *   7/2001   Raab ............................ 455/108
6,987,417 B2 *   1/2006   Winter et al. .................. 330/10
7,139,534 B2 * 11/2006   Tanabe et al. ................ 455/108
(Continued)

FOREIGN PATENT DOCUMENTS

| JP | 2005-20693 | 1/2005 |
| JP | 3824610 | 9/2006 |
| KR | 10-2012-0118340 | 10/2012 |

OTHER PUBLICATIONS

Choi, Jinsung, "A delta sigma-Digitized Polar RF Transmitter," IEEE Transactions on Microwave Theory and Techniques, vol. 55(12):2679-2690 (2007).

*Primary Examiner* — Simon Nguyen
(74) *Attorney, Agent, or Firm* — Nelson Mullins Riley & Scarborough LLP

(57) ABSTRACT

A signal amplification apparatus includes a first modulator configured to receive an envelope signal, use a predetermined reference level to separate the received envelope signal into a first period and a second period, digitally modulate a signal of the second period to output the digitally modulated signal to a first output terminal, and output a signal of the first period to a second output terminal. Further, the signal amplification apparatus includes a second modulator configured to mix the digital modulated signal input through the first output terminal with a phase modulated carrier signal; an envelope modulator configured to output the signal of the first period as a power supply signal; and a power amplifier configured to amplify the mixed signal output by the second modulator to output the amplified signal.

19 Claims, 7 Drawing Sheets

(51) Int. Cl.
*H04W 52/24* (2009.01)
*H04W 52/52* (2009.01)

(56) References Cited

U.S. PATENT DOCUMENTS

| | | | |
|---|---|---|---|
| 7,817,970 B2* | 10/2010 | Puma | 455/114.3 |
| 8,059,748 B2* | 11/2011 | See et al. | 375/296 |
| 2004/0208157 A1* | 10/2004 | Sander et al. | 370/345 |
| 2005/0152471 A1* | 7/2005 | Tanaka et al. | 375/295 |
| 2005/0220219 A1* | 10/2005 | Jensen | 375/302 |
| 2006/0046666 A1* | 3/2006 | Hara et al. | 455/127.1 |
| 2007/0298734 A1* | 12/2007 | Woo et al. | 455/114.3 |
| 2008/0019459 A1* | 1/2008 | Chen et al. | 375/297 |
| 2011/0237210 A1* | 9/2011 | Jung et al. | 455/127.2 |
| 2012/0263257 A1 | 10/2012 | Kim et al. | |
| 2014/0218107 A1* | 8/2014 | Geng et al. | 330/149 |

* cited by examiner

SIGNAL AMPLIFICATION APPARATUS AND METHOD

CROSS-REFERENCE TO RELATED APPLICATION(S)

The present invention claims priority to and the benefit of Korean Patent Application No. 10-2013-0081098, filed on Jul. 10, 2013, which is incorporated herein by reference.

FIELD OF THE INVENTION

The present invention relates to a transmission device in a communication system, and more particularly, to a signal amplification apparatus and method for realizing high efficiency of a power amplifier.

BACKGROUND OF THE INVENTION

Recently, a mobile communication system has evolved into a communication system based on orthogonal frequency-division multiplexing (OFDM) where the amplitude varies significantly unlike Global System for Mobile Communications (GSM). In particular, examples of the communication system based on OFDM include WiMAX and WLAN in addition to LTE.

However, an OFDM based transmitter has a limitation in that its power amplifier does not work efficiently due to overcome the limitation, a variety of transmission structures are proposed, one of which is a polar transmitter structure for separately transmitting a phase signal and an envelope signal to a power amplifier.

The polar transmitter has a structure where the phase signal may be applied to an input terminal of the power amplifier and the envelop signal may be connected to a power supply terminal of the power amplifier to output an original signal from an output terminal of the power amplifier. The power amplifier of the polar transmitter can always operate in a saturation region because of the envelope signal applied to the power supply terminal, thereby maximizing the power efficiency.

However, as the envelop curve has a larger range of variations, a lower level of voltage may be input to the power supply terminal of the power amplifier. Such low envelop voltage causes several limitations. First, efficiency in an envelope modulator for providing the envelope signal to the power amplifier is rapidly reduced when a level of the envelope signal is smaller than a specific level. Accordingly, the polar transmitter structure operates less efficiently in a period where an envelope level is small. Furthermore, if the envelope voltage decreases to a knee voltage of the power amplifier or lower, nonlinearity of the power amplifier may increase rapidly to reduce signal quality.

SUMMARY OF THE INVENTION

In view of the above, the present invention provides a signal amplification apparatus and method having a structure that is less vulnerable to nonlinearity and maintains high efficiency despite an envelope voltage being lowered.

In accordance with a first aspect of the present invention, there is provided a signal amplification apparatus including: a first modulator configured to receive an envelope signal, use a predetermined reference level to separate the received envelope signal into a first period greater than the reference level and a second period less than the reference level, digitally modulate a signal of the second period to output the digitally modulated signal to a first output terminal, and output a signal of the first period to a second output terminal; a second modulator configured to mix the digital modulated signal input through the first output terminal with a phase modulated carrier signal input from the outside to output the mixed signal; an envelope modulator configured to output the signal of the first period as a power supply signal; and a power amplifier configured to amplify the mixed signal output by the second modulator using the power supply signal to output the amplified signal.

Further, the first modulator may digitally modulate the signal below the predetermined level using delta-sigma modulation.

Further, the first modulator may digitally modulate the signal below the predetermined level using pulse-width modulation.

Further, the signal amplification apparatus may further comprise a noise remover configured to remove quantization noise from the amplified signal output by the power amplifier.

Further, the noise remover may be a band pass filter.

Further, the noise remover may set output matching to be in a narrow band to remove quantization noise from the amplified signal output by the power amplifier.

In accordance with a second aspect of the present invention, there is provided a signal amplification apparatus including: a first modulator configured to receive an envelope signal, use a predetermined reference level to separate the received envelope signal into a first period greater than the reference level and a second period less than the reference level, digitally modulate a signal of the second period to output the digitally modulated signal to a first output terminal, and output a signal of the first period to a second output terminal; a coupler configured to combine the digitally modulated signal of the second period with a signal having a certain voltage of a predetermined level in a part corresponding to the first period and output the combined signal; a second modulator configured to mix the combined signal output by the coupler with a phase modulated carrier signal input from the outside to output the mixed signal; an envelope modulator configured to output the signal of the first period as a power supply signal; and a power amplifier configured to amplify the mixed signal output by the second modulator using the power supply signal to output the amplified signal.

Further, the first modulator may digitally modulate the signal below the predetermined level using delta-sigma modulation.

Further, the first modulator may digitally modulate the signal below the predetermined level using pulse-width modulation.

Further, the signal amplification apparatus may further comprise a noise remover configured to remove quantization noise from the amplified signal output by the power amplifier.

Further, the noise remover may be a band pass filter.

Further, the noise remover may set output matching to be in a narrow band to remove quantization noise from the amplified signal output by the power amplifier.

Further, the coupler may combine the digitally modulated signal of the second period with a signal having a voltage level of "1" of the digitally modulated signal of the second period.

Further, the power amplifier may be a nonlinear power amplifier, such as classes D, E, and F.

In accordance with a third aspect of the present invention, there is provided a signal amplification method of a signal amplification apparatus, including: using a predetermined reference level to separate an envelope signal into a first period greater than the reference level and a second period less than the reference level; digitally modulating a signal of the second period to output the digitally modulated signal to a first output terminal, and outputting a signal of the first period to a second output terminal; mixing the digital modulated signal input through the first output terminal with a phase modulated carrier signal input from the outside to output the mixed signal; outputting the signal of the first period as a power supply signal; and amplifying the mixed signal using the power supply signal to output the amplified signal.

Further, the signal amplification method may further comprise removing quantization noise from the amplified output signal.

In accordance with a third aspect of the present invention, there is provided a signal amplification method of a signal amplification apparatus including using a predetermined reference level to separate an envelope signal into a first period greater than the reference level and a second period less than the reference level; digitally modulating a signal of the second period to output the digitally modulated signal to a first output terminal, and outputting a signal of the first period to a second output terminal; combining the digitally modulated signal of the second period with a signal having a certain voltage of a predetermined level in a part corresponding to the first period to output the combined signal; mixing the combined signal with a phase modulated carrier signal input from the outside to output the mixed signal; outputting the signal of the first period as a power supply signal; and amplifying the mixed signal using the power supply signal to output the amplified signal.

Further, the outputting the combined signal may comprise combing the digitally modulated signal of the second period with a signal having a voltage level of "1" of the digitally modulated signal of the second period.

Further, the signal amplification method may further comprise removing quantization noise from the amplified output signal.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Figure 1:
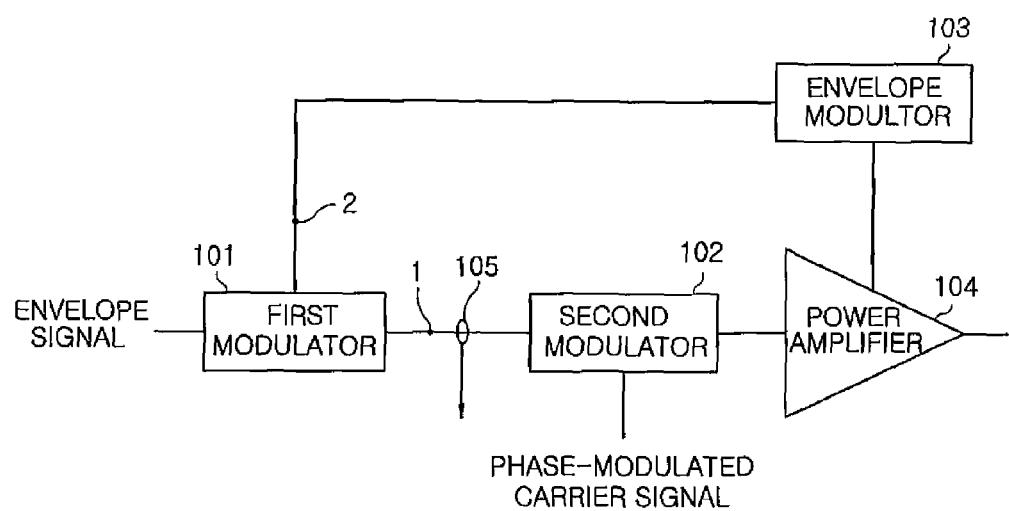
FIG. 1 is a circuit diagram showing a digital modulation type signal amplification apparatus in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, embodiments of the present invention will be described in detail with reference to the accompanying drawings which form a part hereof.

FIG. 1 is a circuit diagram showing a digital modulation type signal amplification apparatus in accordance with an embodiment of the present invention.

Referring to FIG. 1, the signal amplification apparatus in accordance with an embodiment of the present invention may include a first modulator 101, a second modulator 102, an envelope modulator 103, a power amplifier 104, and a coupler 105.

Figure 2A:
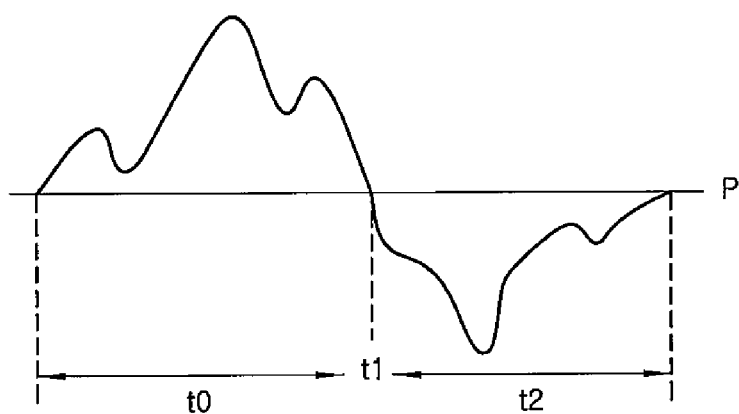
FIGS. 2A to 2D show signal waveforms input/output to/from each configuration of the signal amplification apparatus in accordance with an embodiment of the present invention.

The first modulator 101 may receive an envelope signal as shown in FIG. 2A and digitally modulate a portion of the envelope signal and bypass the other portion of the envelop signal. The first modulator 101 may include a first output terminal 1 for outputting the digitally modulated portion and a second output terminal 2 for outputting the bypassed portion. The first output terminal 1 may be connected to the second modulator 102, and the second output terminal 2 may be connected to the envelope modulator 103. Here, the portion of the envelope signal may be in signal period t2 less than predetermined reference level p, and the other portion of the envelope signal may be in signal period t0 greater than reference level p.

That is, the first modulator 101 modulates the portion of the envelope signal, which is in signal period t2 less than reference level p, into a digital signal of '0' or '1' to output the digital signal to the first terminal 1. The first modulator 101 bypasses (that is, does not process) the other portion of the envelope signal, which is in signal period t0 greater than reference level p, to output the bypassed portion to the envelope modulator 103 through the second output terminal 2.

To this end, when receiving an envelope signal, the first modulator 101 separates the received envelope signal into a signal greater than reference level p and a signal less than reference level p, and converts the signal less than the reference in signal period t2 into a digital signal of '0' or '1'. In this case, the conversion method may include, for example, digital signal modulation methods for restoring an original signal through signal filtering, such as delta-sigma modulation or pulse-width modulation.

The digitally modulated envelope signal, that is, the digitally modulated portion of signal period t2 less than reference level p is input to the coupler 105. The coupler 105 combines the digitally modulated portion of signal period t2 with a signal having a constant voltage to generate to output a combined signal to the second modulator 102.

On the other hand, a signal of signal period t0 greater than reference level p is not processed, and output to the envelope modulator 103. Thus, an input signal having any certain voltage in signal period t2 less than reference level p is input to the envelop modulator 103. On the other hand, a signal of signal period t0 that is over the reference level p is not processed, and output to the envelope modulator 103.

When, receiving the input signal from the first modulator 101, the envelope modulator 103 has great power driving capability and outputs the signal to a power supply terminal of the power amplifier 104. In this case, a signal period t2 of the output signal of the envelope modulator 103, which is digitally modulated by the first modulator 101, is set as a certain voltage greater than the knee voltage, and thus in signal period t2, the envelope modulator 103 may operate efficiently, and an output signal of the power amplifier 104 may maintain low nonlinearity.

For more detailed description, efficiency of the power modulator such as the envelope modulator 103 becomes low as a ratio of output voltage to maximum output voltage becomes low, and is rapidly reduced at the certain voltage or less. Thus, too low voltage is not output in order to efficiently operate the power modulator. Also, when a too low voltage is applied to the power supply terminal of the power amplifier 104, a phase of the output signal of the power amplifier 104 varies greatly to increase the nonlinearity of the power amplifier 104, as compared with when a relatively high voltage is applied.

Figure 2B:
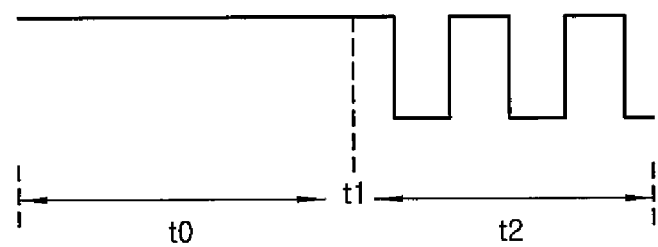
Figure 2C:
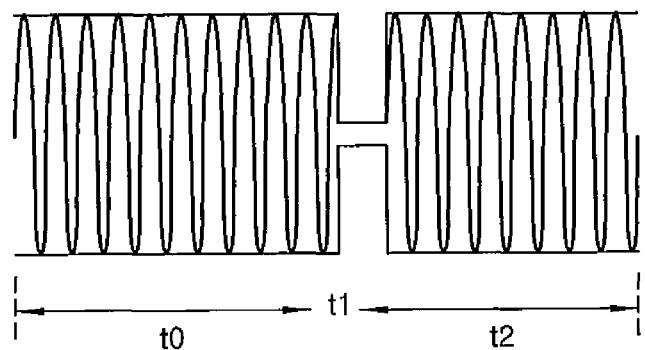

When receiving a phase-modulated carrier signal from the outside, the second modulator 102 mixes the combined signal as shown in FIG. 2B with the phase-modulated carrier signal to generate a signal as shown in FIG. 2C and output the signal to an input terminal of the power amplifier 104. That is, a signal output by the second modulator 102 may be used as the input signal of the power amplifier 104.

Figure 2D:
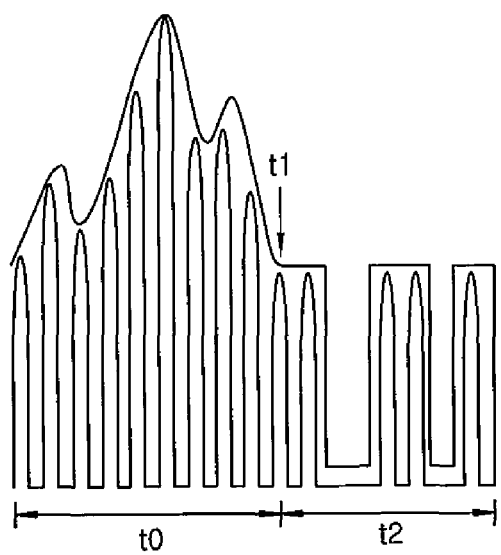

The power amplifier 104 receives the output signal of the second modulator 102 as the input signal, and receives the output signal of the envelope modulator as a power supply signal to amplify the input signal and output the amplified signal as shown in FIG. 2D.

A signal amplification process of the power amplifier 104 will be described as follows.

Among the signal input to the power amplifier 104, a signal of signal period t0 greater than reference level p in the first modulator 101 is restored to an original envelope signal using an envelope signal provided by the envelope modulator 103 during an amplification process of the power amplifier 104 and a signal of signal period t2 less than reference level p, that is, a digitally modulated signal in the first modulator 101 is amplified by the power amplifier 104 using a switching operation.

Figure 3:
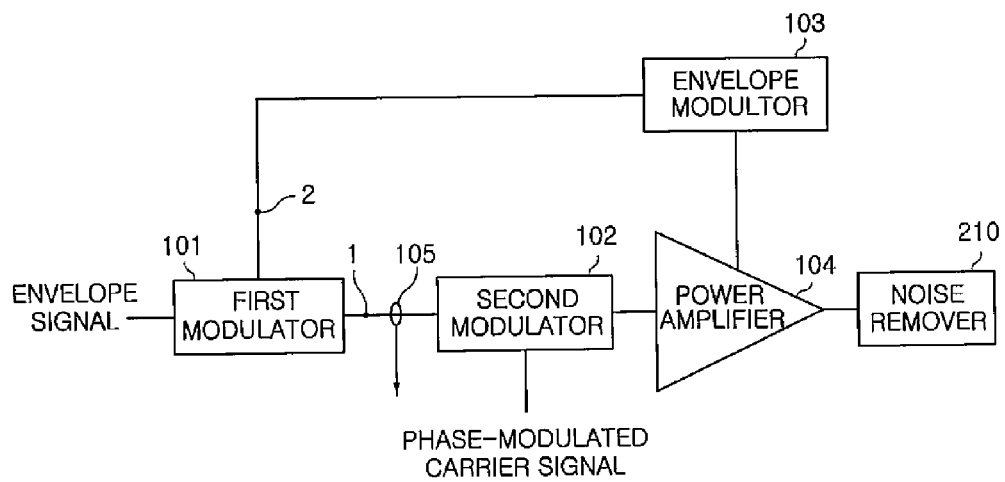
FIG. 3 is a circuit diagram showing a digital modulation type signal amplification apparatus in accordance with another embodiment of the present invention.

The output signal of the power amplifier 104 may have quantization noise. Thus, as shown in FIG. 3, the noise remover 210 may be connected to the output terminal of the power amplifier 104. The noise remover 210 removes the quantization noise from the digitally modulated signal and outputs the digitally modulated signal with the quantization noise removed therefrom.

Examples of such noise remover 210 include, but are not limited to, a band pass filter or an output matching circuit. Here, the output matching circuit allows an output signal of the power amplifier 104 to have a narrow band.

When the quantization noise is removed by the noise remover 210, the original envelope signal may be restored.

Figure 4:
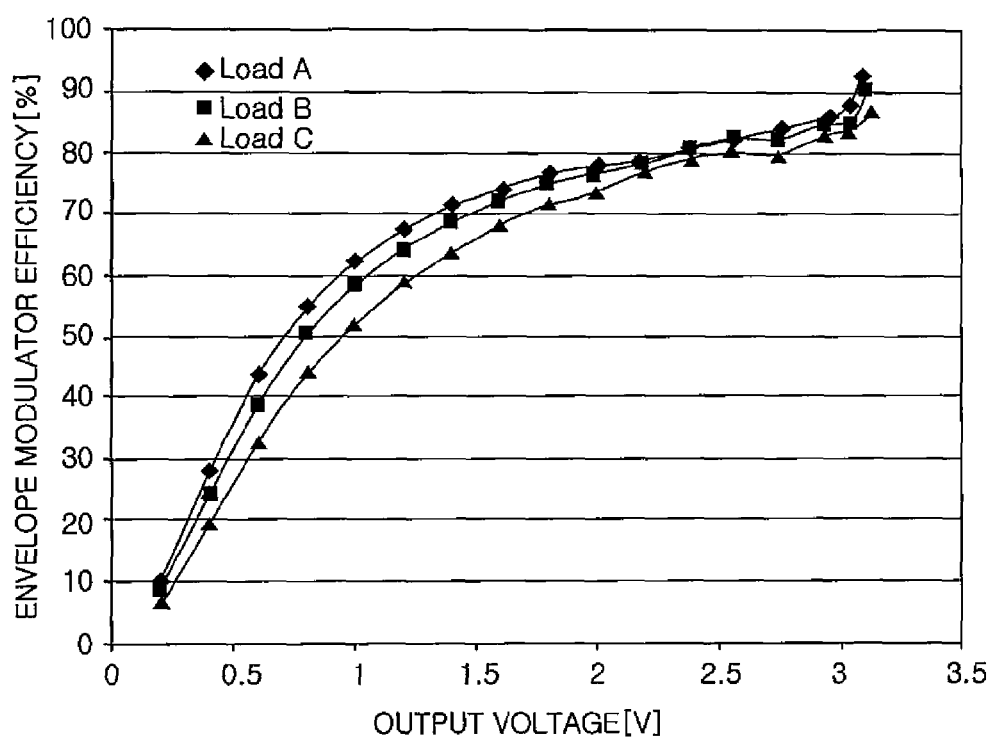
FIG. 4 shows a result of measuring efficiency of an envelope modulator with respect to voltage.

FIG. 4 is a view showing a result of measuring efficiency of an envelope modulator with respect to output voltage when the output voltage is changed to have various levels of loads.

It can be seen that the efficiency is rapidly reduced when the output voltage of the envelope modulator 103 is about 1V or less. Accordingly, in order to overcome the low efficiency, the output voltage of the envelope modulator may be preferably maintained at a certain level or higher.

Figure 5:
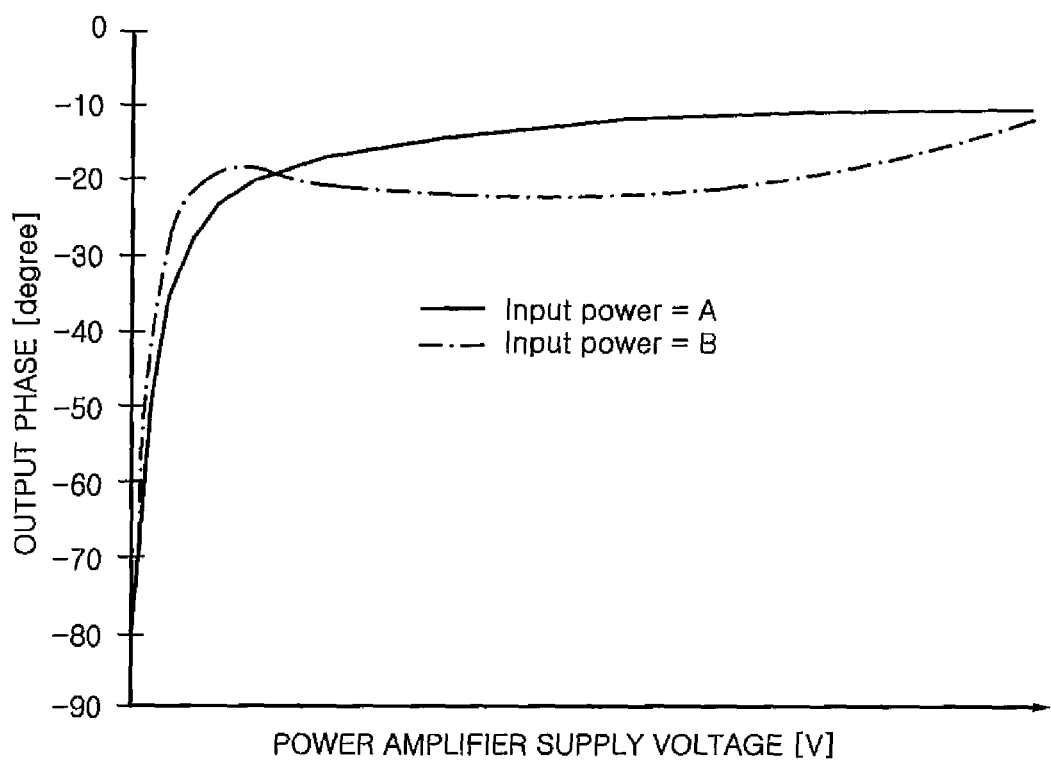
FIG. 5 is a graph showing how much a phase of an output signal of the power amplifier varies when a variety of voltages are applied to a power supply terminal of the power amplifier.

FIG. 5 is a graph showing how much a phase of an output signal of the power amplifier 104 varies when various levels of voltages are applied to the power supply terminal of the power amplifier. It can be seen that a phase of the output signal of the power amplifier rapidly varies when the voltage applied to the power supply terminal of the power amplifier 104 decreases below any specific level. The rapid variation in phase is represented as an aspect of spectral regrowth in terms of frequency, and thus it can be seen that linearity deteriorates. Accordingly, in order to overcome this limitation, the output voltage of the envelope modulator 104 may be preferably maintained at a certain level or higher.

As described above, a signal of signal period t0 greater than the reference level among signals output from the first modulator 101 to the second modulator 102 in FIG. 1 is replaced with a certain voltage signal. In this case, the certain voltage level may be the same as a voltage level of '1' of the digitally modulated signal having '0's or '1's, which is a signal of signal period t2 less than the reference level. Thus, the signal of an entire signal period may be modulated into a digital signal having an envelope level state of '0' or '1', thereby using a nonlinear amplifier having high efficiency, such as class D, E, or F, as the power amplifier 104.

Subsequently, when receiving the output signal of the second modulator 102 as an input signal and receiving the output signal of the envelop modulator 103 as a power supply signal, the power amplifier 104 experiences the following signal amplification process. Among the signal input to the power amplifier, a signal having the same voltage level as '1' state of the digitally modulated signal of signal period t0 greater than reference magnitude p in the first modulator 101 is restored to an original envelope signal using an envelope signal provided by the envelope modulator 103 during an amplification process of the power amplifier 104 and a signal of signal period t2 less than reference magnitude p, that is, a digitally modulated signal by the first modulator 101 is amplified by the power amplifier 104 using a switching operation. Then, the original envelope signal may be restored by filtering the output signal of the power amplifier 104 to remove the quantization noise from the digitally modulated signal.

Figure 6:
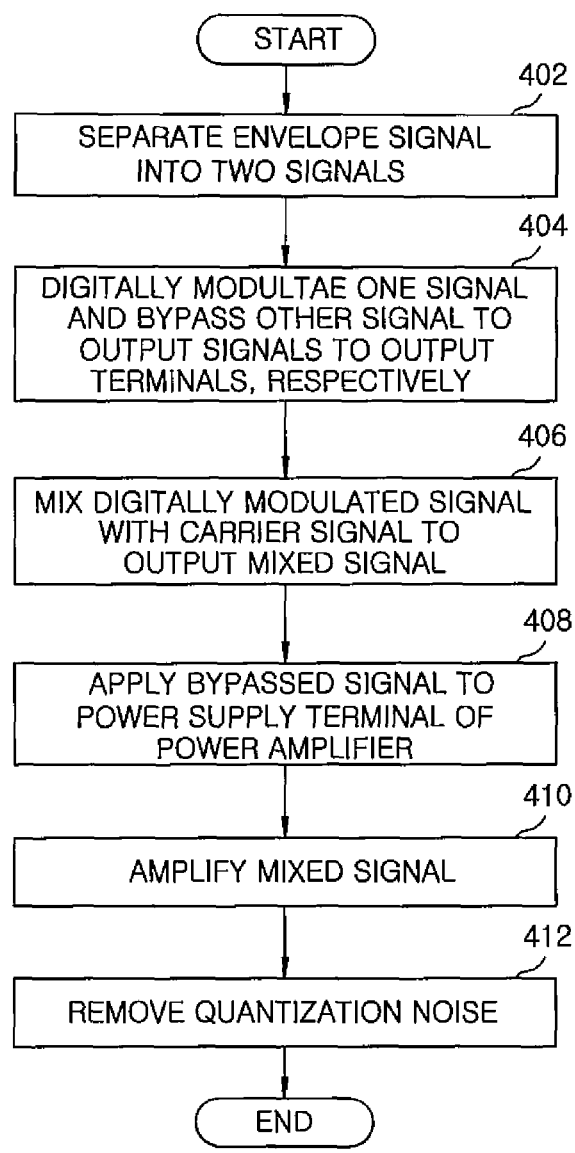
FIG. 6 is a flow chart showing a signal amplification method in accordance with an embodiment of the present invention.

FIG. 6 is a flow chart showing a signal amplification method in accordance with an embodiment of the present invention.

Referring to FIGS. 1 and 6, the first modulator 101 of the signal amplification apparatus receives an envelope signal and separates the received envelope signal into two signals in operation 402. The first modulator 101 digitally modulates and outputs one signal to the second modulator 102, and bypasses and outputs the other signal to the envelope modulator 101 in operation 404. Here, the one signal means a signal of the signal period less than the reference level, and the other signal means a signal of the signal period greater than the reference level.

Subsequently, the second modulator 102 mixes the digitally modulated signal with the phase-modulated carrier signal input from the outside in operation 406, and outputs the mixed signal to the power amplifier 104.

In an embodiment of the present invention, for example, it is described that the digitally modulated signal is directly input to the second modulator 102. The digitally modulated signal may be combined with a signal with a certain voltage level and then input to the second modulator 102. In this case, the certain voltage may have the same voltage level as '1' of the digitally modulated signal having '0's or '1's, which is a signal of a signal period less than the envelope reference level.

The signal bypassed and input to the envelope modulator 103 is applied to the power supply terminal of the power amplifier 104 in operation 408.

Accordingly, the mixed signal is amplified and output depending on the signal applied to the power supply terminal in operation 410.

Then, the quantization noise is removed from the amplified signal, and a final signal is output in operation 412.

The present invention can prevent the output signal of the envelop modulator from decreasing to a low voltage, thereby decreasing nonlinearity of the power amplifier as well as increasing efficiency of the transmitter.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A signal amplification apparatus comprising:
   a first modulator configured to receive an envelope signal, use a predetermined reference level to separate the received envelope signal into a first period greater than the reference level and a second period less than the reference level, digitally modulate a signal of the second period to output the digitally modulated signal to a first output terminal, and output a signal of the first period to a second output terminal;
   a second modulator configured to mix the digital modulated signal input through the first output terminal with a phase modulated carrier signal input from outside the second modulator to output a mixed signal;
   an envelope modulator configured to output the signal of the first period as a power supply signal; and
   a power amplifier configured to amplify the mixed signal output by the second modulator using the power supply signal to output an amplified signal.

2. The signal amplification apparatus of claim 1, wherein the first modulator digitally modulates the signal below the predetermined level using delta-sigma modulation.

3. The signal amplification apparatus of claim 1, wherein the first modulator digitally modulates the signal below the predetermined level using pulse-width modulation.

4. The signal amplification apparatus of claim 1, further comprising a noise remover configured to remove quantization noise from the amplified signal output by the power amplifier.

5. The signal amplification apparatus of claim 4, wherein the noise remover is a band pass filter.

6. The signal amplification apparatus of claim 4, wherein the noise remover sets output matching to be in a narrow band to remove quantization noise from the amplified signal output by the power amplifier.

7. A signal amplification apparatus comprising:
   a first modulator configured to receive an envelope signal, use a predetermined reference level to separate the received envelope signal into a first period greater than the reference level and a second period less than the reference level, digitally modulate a signal of the second period to output the digitally modulated signal to a first output terminal, and output a signal of the first period to a second output terminal;
   a coupler configured to combine the digitally modulated signal of the second period with a signal having a certain voltage of a predetermined level in a part corresponding to the first period to output a combined signal;
   a second modulator configured to mix the combined signal output by the coupler with a phase modulated carrier signal input from outside the second modulator to output a mixed signal;
   an envelope modulator configured to output the signal of the first period as a power supply signal; and
   a power amplifier configured to amplify the mixed signal output by the second modulator using the power supply signal to output an amplified signal.

8. The signal amplification apparatus of claim 7, wherein the first modulator digitally modulates the signal below the predetermined level using delta-sigma modulation.

9. The signal amplification apparatus of claim 7, wherein the first modulator digitally modulates the signal below the predetermined level using pulse-width modulation.

10. The signal amplification apparatus of claim 7, further comprising a noise remover configured to remove quantization noise from the amplified signal output by the power amplifier.

11. The signal amplification apparatus of claim 10, wherein the noise remover is a band pass filter.

12. The signal amplification apparatus of claim 10, wherein the noise remover sets output matching to be An a narrow band to remove quantization noise from the amplified signal output by the power amplifier.

13. The signal amplification apparatus of claim 7, wherein the coupler combines the digitally modulated signal of the second period with a signal having a voltage level of "1" of the digitally modulated signal of the second period.

14. The signal amplification apparatus of claim 13, wherein the power amplifier is a nonlinear power amplifier, such as classes D, E, and F.

15. A signal amplification method of a signal amplification apparatus, comprising:
   using a predetermined reference level to separate an envelope signal into a first period greater than the reference level and a second period less than the reference level;
   digitally modulating a signal of the second period to output the digitally modulated signal to a first output terminal, and outputting a signal of the first period to a second output terminal;
   mixing the digital modulated signal input through the first output terminal with a phase modulated carrier signal input from outside the second modulator to output a mixed signal;
   outputting the signal of the first period as a power supply signal; and
   amplifying the mixed signal using the power supply signal to output an amplified signal.

16. The signal amplification method of claim 15, further comprising removing quantization noise from the amplified signal.

17. A signal amplification method of a signal amplification apparatus comprising:
   using a predetermined reference level to separate an envelope signal into a first period greater than the reference level and a second period less than the reference level;
   digitally modulating a signal of the second period to output the digitally modulated signal to a first output terminal, and outputting a signal of the first period to a second output terminal; combining the digitally modulated signal of the second period with a signal having a certain voltage of a predetermined level in a part corresponding to the first period to output a combined signal;

mixing the combined signal with a phase modulated carrier signal input from outside the second modulator to output a mixed signal;

outputting the signal of the first period as a power supply signal; and amplifying the mixed signal using the power supply signal to output an amplified signal.

18. The signal amplification method of claim 17, wherein the outputting the combined signal comprises combing the digitally modulated signal of the second period with a signal having a voltage level of "1" of the digitally modulated signal of the second period.

19. The signal amplification method of claim 17, further comprising removing quantization noise from the amplified signal.

* * * * *